(12) United States Patent
Habibi (10) Patent No.: US 12,049,168 B2
(45) Date of Patent: Jul. 30, 2024

(54) REARVIEW MIRROR ASSEMBLY WITH FLEXIBLE GLASS SUBSTRATE

(71) Applicant: Magna Mirrors of America, Inc., Holland, MI (US)

(72) Inventor: Hamid Habibi, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 545 days.

(21) Appl. No.: 17/248,317

(22) Filed: Jan. 20, 2021

(65) Prior Publication Data

US 2021/0221290 A1 Jul. 22, 2021

Related U.S. Application Data

(60) Provisional application No. 62/963,303, filed on Jan. 20, 2020.

(51) Int. Cl.
*B60R 1/02* (2006.01)
(52) U.S. Cl.
CPC .................... *B60R 1/025* (2013.01)
(58) Field of Classification Search
CPC .. B60R 1/025; B60R 1/04; B60R 1/06; B60R 1/12; B60R 1/07; B60R 1/08
USPC .................. 359/843, 846, 839, 877
See application file for complete search history.

(56) References Cited

U.S. PATENT DOCUMENTS

| | | | |
|---|---|---|---|
| 2,664,785 A * | 1/1954 | Roehrig | B60R 1/082 74/502.1 |
| 4,712,879 A | 12/1987 | Lynam et al. | |
| 5,052,792 A * | 10/1991 | McDonough | B60R 1/025 359/846 |
| 5,073,012 A | 12/1991 | Lynam | |
| 5,076,673 A | 12/1991 | Lynam et al. | |
| 5,115,346 A | 5/1992 | Lynam | |
| 5,140,455 A | 8/1992 | Varaprasad et al. | |
| 5,142,407 A | 8/1992 | Varaprasad et al. | |
| 5,151,816 A | 9/1992 | Varaprasad et al. | |
| 5,253,109 A | 10/1993 | O'Farrell et al. | |
| 5,406,414 A | 4/1995 | O'Farrell et al. | |
| 5,525,264 A | 6/1996 | Cronin et al. | |
| 5,567,360 A | 10/1996 | Varaprasad et al. | |
| 5,610,756 A | 3/1997 | Lynam et al. | |
| 5,668,663 A | 9/1997 | Varaprasad et al. | |
| 5,724,187 A | 3/1998 | Varaprasad et al. | |
| 5,910,854 A | 6/1999 | Varaprasad et al. | |
| 6,002,511 A | 12/1999 | Varaprasad et al. | |
| 6,154,306 A | 11/2000 | Varaprasad et al. | |
| 6,178,034 B1 | 1/2001 | Allemand et al. | |
| 6,690,268 B2 | 2/2004 | Schofield et al. | |
| 7,184,190 B2 | 2/2007 | McCabe et al. | |
| 7,195,381 B2 | 3/2007 | Lynam et al. | |

(Continued)

*Primary Examiner* — Ricky D Shafer
(74) *Attorney, Agent, or Firm* — HONIGMAN LLP (57) ABSTRACT

A vehicular rearview mirror assembly includes a mirror reflective element that has a flexible glass substrate with a mirror reflector coating at a surface of the flexible glass substrate. An electrically-operated actuator is operable to cause flexing of the flexible glass substrate. With the vehicular rearview mirror at a vehicle, and responsive to actuation of a user input by a driver of the vehicle, the electrically-operated actuator operates to adjust a curvature of the flexible glass substrate to adjust at least a portion of a rearward view of the driver of the vehicle when viewing the mirror reflective element.

28 Claims, 5 Drawing Sheets

(56) References Cited

U.S. PATENT DOCUMENTS

| | | | |
|---|---|---|---|
| 7,224,324 B2* | 5/2007 | Quist | B60R 1/12 359/267 |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,360,932 B2 | 4/2008 | Uken et al. | |
| 7,420,756 B2* | 9/2008 | Lynam | G02B 27/0006 359/884 |
| 7,626,749 B2 | 12/2009 | Baur et al. | |
| 8,049,640 B2 | 11/2011 | Uken et al. | |
| 8,277,059 B2 | 10/2012 | McCabe et al. | |
| 8,508,831 B2 | 8/2013 | De Wind et al. | |
| 8,529,108 B2 | 9/2013 | Uken et al. | |
| 8,730,553 B2 | 5/2014 | De Wind et al. | |
| 9,327,649 B2 | 5/2016 | Habibi | |
| 9,694,750 B2* | 7/2017 | Lynam | G02F 1/157 |
| 10,029,614 B2 | 7/2018 | Larson | |
| 10,046,706 B2 | 8/2018 | Larson et al. | |
| 10,166,924 B2 | 1/2019 | Baur | |
| 10,421,404 B2 | 9/2019 | Larson et al. | |
| 10,442,360 B2 | 10/2019 | LaCross et al. | |
| 10,543,785 B2 | 1/2020 | Habibi | |
| 2005/0134983 A1* | 6/2005 | Lynam | B60R 1/12 359/872 |
| 2006/0273304 A1* | 12/2006 | Cok | H10K 50/80 438/26 |
| 2007/0058257 A1* | 3/2007 | Lynam | B60Q 1/0023 359/604 |
| 2014/0022390 A1 | 1/2014 | Blank et al. | |
| 2014/0022620 A1* | 1/2014 | Baur | B60R 1/06 65/60.8 |
| 2014/0266666 A1* | 9/2014 | Habibi | B60Q 1/2665 340/475 |
| 2014/0293169 A1 | 10/2014 | Uken et al. | |
| 2015/0097955 A1 | 4/2015 | De Wind et al. | |
| 2017/0355312 A1 | 12/2017 | Habibi et al. | |
| 2018/0134219 A1* | 5/2018 | Kurihara | G02B 7/185 |
| 2019/0031105 A1* | 1/2019 | Kim | B60R 1/081 |
| 2019/0077262 A1* | 3/2019 | Benjamin | B32B 17/06 |
| 2019/0118717 A1 | 4/2019 | Blank et al. | |
| 2019/0146297 A1 | 5/2019 | Lynam et al. | |
| 2019/0258131 A9 | 8/2019 | Lynam et al. | |
| 2019/0291645 A1* | 9/2019 | Li | G06F 1/1652 |
| 2020/0062632 A1* | 2/2020 | Brennan | B32B 17/10091 |
| 2020/0377022 A1 | 12/2020 | LaCross et al. | |
| 2021/0155167 A1 | 5/2021 | Lynam et al. | |
| 2021/0162926 A1 | 6/2021 | Lu | |

* cited by examiner

REARVIEW MIRROR ASSEMBLY WITH FLEXIBLE GLASS SUBSTRATE

CROSS REFERENCE TO RELATED APPLICATION

The present application claims the filing benefits of U.S. provisional application Ser. No. 62/963,303, filed Jan. 20, 2020, which is hereby incorporated herein by reference in its entirety.

FIELD OF THE INVENTION

The present invention relates generally to the field of rearview mirror assemblies for vehicles, such as interior and exterior rearview mirror assemblies.

BACKGROUND OF THE INVENTION

It is known to provide a mirror assembly that is adjustably mounted to an interior portion of a vehicle, or that is mounted at an exterior portion of a vehicle. The mirror assembly includes a mirror reflective element, such as an electrochromic mirror reflective element having a front glass substrate and a rear glass substrate with an electrochromic medium sandwiched between the glass substrates, or such as a single glass substrate having a mirror reflector coating disposed thereat.

SUMMARY OF THE INVENTION

The present invention provides a vehicular rearview mirror assembly that comprises a mirror reflective element comprising a flexible glass substrate having a mirror reflector coating disposed at a surface of the flexible glass substrate. An electrically-operated actuator is operable to cause flexing of the flexible glass substrate. With the vehicular rearview mirror disposed at a vehicle, and responsive to actuation of a user input by a driver of the vehicle, the electrically-operated actuator operates to adjust a curvature of the flexible glass substrate to adjust at least a portion of a rearward view of the driver when viewing the mirror reflective element.

The vehicular rearview mirror assembly may comprise an interior vehicular rearview mirror assembly or an exterior vehicular rearview mirror assembly. The mirror reflective element may comprise a single flexible glass substrate (such as for an interior prismatic mirror or an exterior single substrate mirror), or may comprise an electrochromic mirror reflective element having two flexible glass substrates with an electrochromic medium disposed therebetween.

These and other objects, advantages, purposes and features of the present invention will become apparent upon review of the following specification in conjunction with the drawings.

DESCRIPTION OF THE PREFERRED EMBODIMENTS

Figure 1:
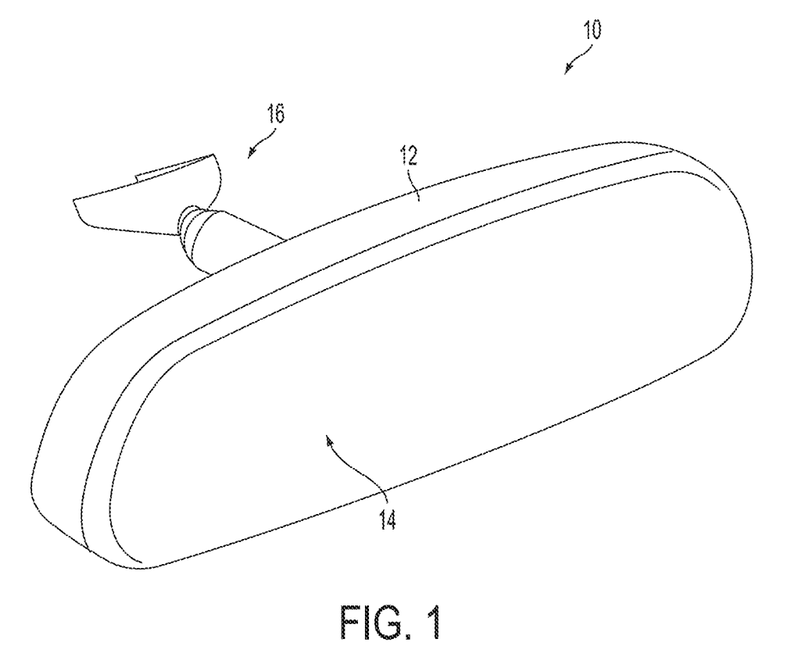
FIG. 1 is a perspective view of an interior vehicular rearview mirror assembly having a mirror reflective element in accordance with the present invention.

Referring now to the drawings and the illustrative embodiments depicted therein, an interior rearview mirror assembly 10 for a vehicle includes a casing 12 and a mirror reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element comprises a thin flexible or conformable glass substrate that facilitates making the mirror in different shapes and having different curvatures or bends, as discussed below.

Plastic substrates for plastic based non electrochromic (EC) mirrors can be formed or bent, and similar formability and flexibility is also available for displays such as OLED on flexible plastic substrates. This formability allows for new form/function for standard non EC mirrors and for video mirrors using plastic substrates.

The mirror assembly 10 of the present invention includes one or more flexible glass substrates 20 to provide a flexible or conformable or adaptable mirror. Optionally, the mirror assembly 10 may include a display element 22 (such as a thin flexible OLED display element) to provide display of images (such as video images or information) at the mirror reflective element. For example, the flexible glass substrate may have a thin flexible display element disposed thereat, such as by utilizing aspects of the mirror assemblies described in U.S. Pat. No. 9,327,649, which is hereby incorporated herein by reference in its entirety. Such thin OLED displays allow for having flexible display elements disposed at and behind the flexible glass substrate to provide the desired flexible or adaptable shape of the reflective element, and such thin OLED displays may be curved or bent or folded to accommodate the thin flexible glass substrate of the reflective element.

Thus, when the display screen is deactivated, adjustment of the curvature of the attachment plate and flexible glass substrate adjusts at least a portion of a rearward view of the driver of the vehicle when viewing the mirror reflective element. The display screen may comprise a full mirror display (where the display screen occupies at least 75 percent, or at least 90 percent of the viewable reflective area of the mirror reflective element), whereby, when the display screen is activated, adjustment of the curvature of the attachment plate and flexible glass substrate adjusts at least a portion of the display such as to optimize viewing of the display by the driver or optionally by a passenger in the vehicle. Such a full mirror display may utilize aspects of a dual mode mirror/display system that can switch from a traditional reflection mode to a live-video display mode, such as described in U.S. Pat. Nos. 10,442,360; 10,421,404; 10,166,924; 10,046,706 and/or 10,029,614, and/or U.S. Publication Nos. US-2019-0258131; US-2019-0146297; US-2019-0118717 and/or US-2017-0355312, and/or U.S. provisional applications, Ser. No. 62/942,351, filed Dec. 2, 2019, Ser. No. 62/941,089, filed Nov. 27, 2019, and/or Ser. No. 62/942,305, filed Dec. 2, 2019, which are all hereby incorporated herein by reference in their entireties.

The thin flexible glass substrate for the mirror reflective element thus provides new form/function for EC and non EC mirror devices.

Figure 2:
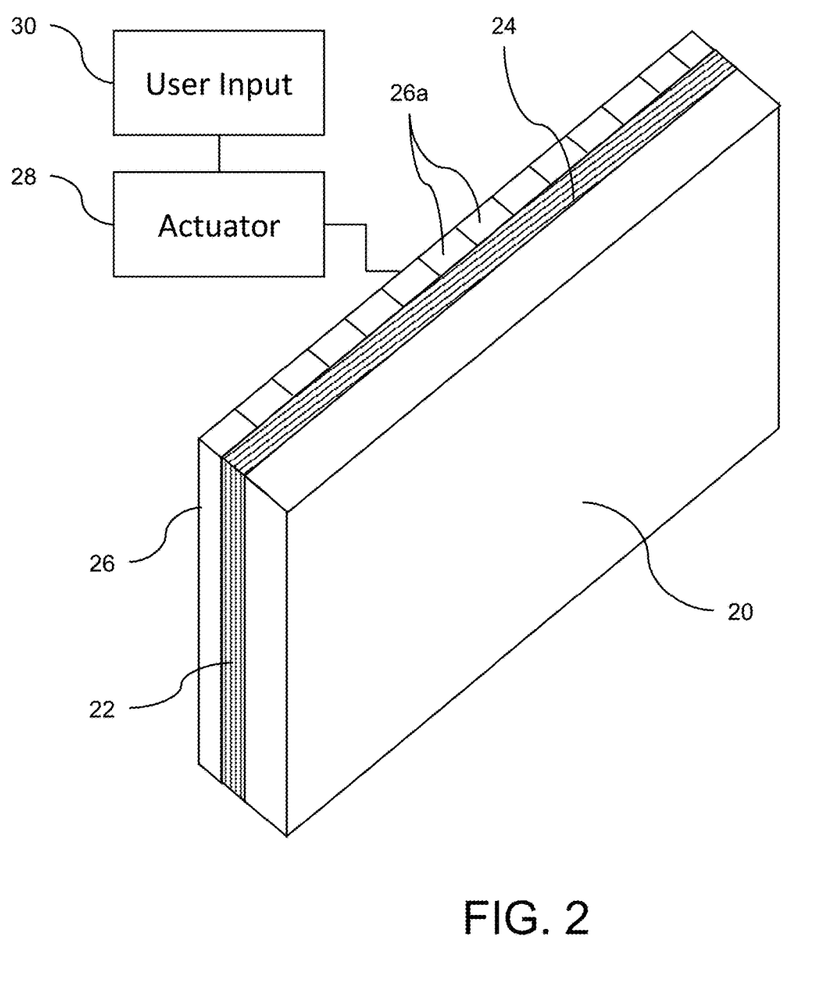
FIG. 2 is a perspective view of a flat glass substrate suitable for a mirror reflective element.
Figure 3:
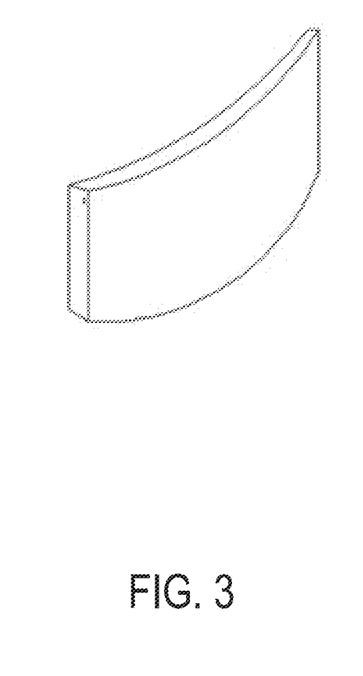
FIG. 3 is a perspective view of a curved glass substrate suitable for a mirror reflective element.
Figure 4:
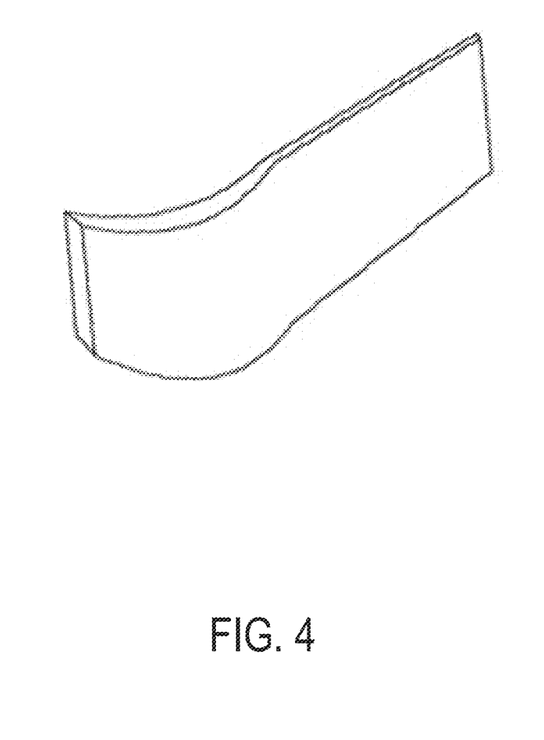
FIG. 4 is a perspective view of a glass substrate suitable for a mirror reflective element, having a flat portion and a curved portion.

For an interior non EC mirror or non EC video mirror, the mirror reflective element may be made as a flat mirror but formed to have a curved edge along the sides, top or bottom for different functions. For example, the glass substrate may comprise a flat substrate (FIG. 2), or may comprise or be flexed to become a curved or bent substrate (FIG. 3), which allows for a wider angle view to the driver viewing the mirror reflective element. Optionally, and as shown in FIG. 4, the glass substrate may be formed or adjusted so that only part of the glass substrate (such as at one end or side of the substrate) is curved or bent, while the rest of the glass substrate is flat. The glass substrate can be formed to the desired shape, or the glass substrate may comprise a flexible glass substrate that can be shaped or curved or bent on demand to provide the desired shape or curvature.

The flexible or conformable glass substrate may be formed with a curvature that follows a fixed contoured back-plate such that the glass has a variable radius of curvature to increase the field of view to the driver viewing the mirror reflective element. The change in radius may be cylindrical for a fixed radius or may be a continuously changing radius for a greater field of view. The radius may be changed on demand by mechanical means of bending the glass, such as bending the glass using an actuator.

For example, the flexible glass substrate 20 (with a mirror reflector 24 coated thereon and/or with a flexible display element 22 attached thereat) may be mounted at a flexible or conformable or segmented back plate or attachment plate structure 26, with an actuator 28 or adjusting means connected to multiple segments or regions 26a of the structure 26. Actuation of the actuator 28 causes the actuator 28 to move one or more of the segments or regions 26a of the structure 26 relative to the others, thereby causing flexing or adjustment of the flexible mirror element. The electrically-operated actuator operates to adjust the curvature of the flexible mirror element responsive to actuation of a user actuatable input 30 by a driver of the vehicle.

Figure 6:
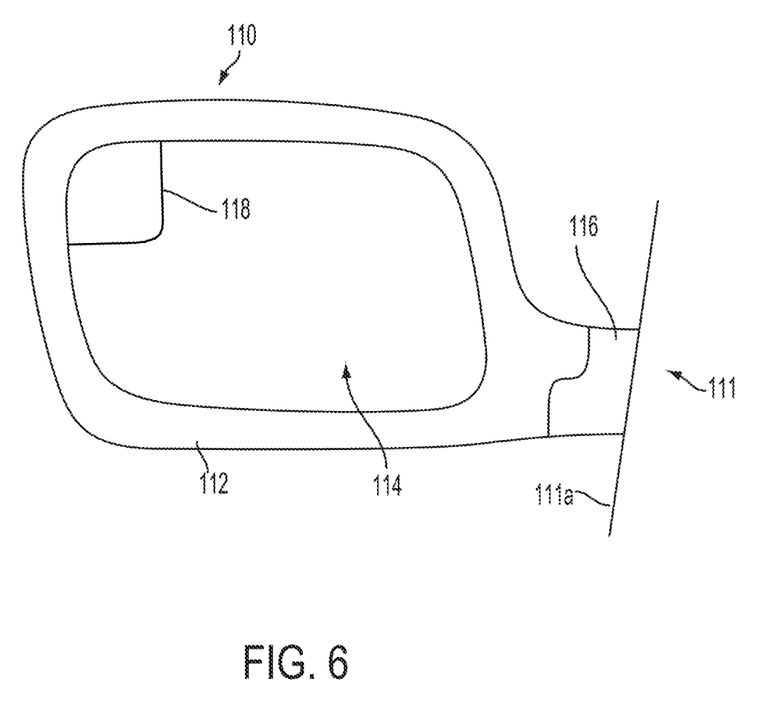
FIG. 6 is a plan view of an exterior rearview mirror having a mirror reflective element in accordance with the present invention.

As shown in FIG. 1, the flexible mirror reflective element may be suitable for use in an interior rearview mirror application. Optionally, and such as shown in FIG. 6, the flexible glass substrate 114 may be incorporated in an exterior rearview mirror assembly 110 for a vehicle 111. The mirror reflective element 114 may be disposed at and/or supported at a mirror head 112. The mirror head 112 may be fixedly attached at a mounting arm or base 116 at the side portion 111a of the vehicle 111 or may be movably mounted to the mounting arm or base or portion 116, and may comprise a breakaway mirror (where the mirror head portion may be manually pivoted about the mounting arm or base) or may comprise a powerfold mirror (where the mirror head portion may be pivoted via an actuator assembly or adjustment device). The mounting arm or base 116 is mounted at the side of the vehicle, with the reflective element 114 providing to the driver a desired and adjustable rearward field of view along the respective side of the vehicle.

Thus, for example, if the driver wants to change his or her rearward view (when viewing the mirror reflective element, such as at an exterior rearview mirror), the driver may control bending of the reflective element (such as via a toggle or button similar to the four-way controls for an exterior mirror actuator) via controlled movement of the actuator to bend or curve a selected side region of the reflective element to provide a wider angle view at that side of the vehicle and/or to bend or curve a selected upper or lower region of the reflective element to provide a vertically extended view at that side of the vehicle. Such an application provides selective control of the rearward view to the driver, so that the exterior mirror may selectively provide a wide-view mode or blind spot view mode or a trailer viewing mode or a curb viewing mode to the driver. Thus, responsive to actuation by the user, the electrically-operated actuator may operate to flex the mirror reflective element from a planar unit magnification state to a convex-curved state with a radius of curvature of the flexed glass substrate being less than 3,000 mm, such as less than 2,000 mm, such as less than 1,000 mm. When the mirror reflective element is flexed to a convex-curvature of, for example, 1,200 mm, the driver, viewing the flexed, convex-curved mirror reflective element, has a wider rearward view as compared to when the mirror reflective element is in its planar state.

Optionally, the system may automatically bend or curve the reflective element responsive to detection of another vehicle in the side lane adjacent to the equipped vehicle and overtaking the equipped vehicle (or responsive to determination of hitching of a trailer at the vehicle), so as to enhance the driver's ability to see another vehicle when it may otherwise be in a blind spot (before the system re-shapes the reflective element). For example, the system may automatically bend or curve the reflective element responsive to activation of other functions and features of the vehicle such as commencing a reverse maneuver of the vehicle (where shifting the vehicle into a reverse gear may activate the exterior mirrors to bend in such a way to provide a curb view to the driver). The adjustment of the mirror element may adjust the outboard region to be more curved (for the blind spot viewing mode or trailering mode) and may adjust the inboard and center regions to a lesser degree so as to still provide approximately the same view rearward and along the side of the vehicle to the driver.

Optionally, a display element may be disposed at and behind the mirror element and may generate demarcation lines or segments to demarcate the sections (e.g., principal rearward view and auxiliary wide angle view) when the mirror element is shaped or flexed to provide different views. For example, if an upper outboard corner or laterally outboard portion of the mirror element is flexed to be more curved to provide a wide angle element or portion, a demarcation (see, for example, demarcation 118 in FIG. 6) may be generated at the transition from the generally planar principal reflecting portion of the mirror element to the adjusted or flexed or now-curved wide angle portion of the mirror element. As the user adjusts the flexing of the attachment plate and glass substrate to adjust the rearward or sideward or downward view, the demarcations are adjusted to move or follow the change in curvature or transition region. Optionally, the attachment plate and/or mirror reflective element may have a region that does not flex to provide the regulatory required rearward view to the driver, with peripheral regions of the attachment plate and/or mirror reflective element being adjustable to provide the desired wide angle or blind spot or curb view to the driver of the vehicle.

Optionally, one section of the mirror reflective element may bend (such as shown in FIG. 4) to provide a similar function as a coplanar mirror having two separate mirror elements—one being a planar or slightly curved principal mirror element and the other being a more curved auxiliary or wide angle mirror element.

The mirror element may be formed to various shapes with varying degrees of bend or radii of curvature for glass substrates suitable for use on the interior or exterior rearview mirror assembly. For example, the flexible substrate may be formed with a generally planar portion, and with a sharply bent end region or side region, where one or more user inputs and/or indicators or the like may be disposed so as to be viewable by and accessible by the driver, while not interfering with the principal reflecting area of the mirror reflective element.

Figure 5:
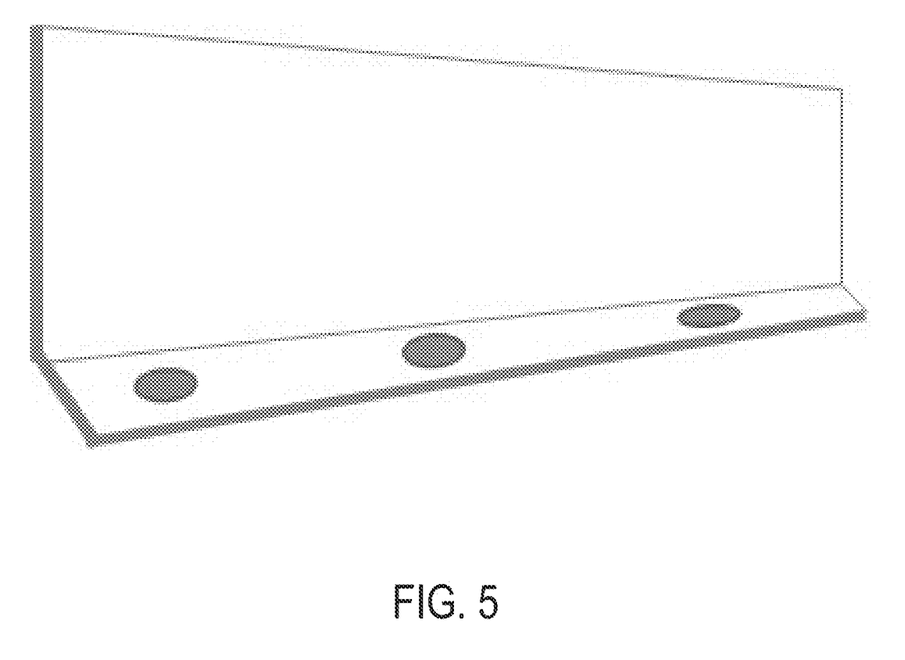
FIG. 5 is a perspective view of a glass substrate suitable for a mirror reflective element, with a folded portion along a lower region for accommodating display features or touch sensors.

The glass substrate may be formed with peripheral portions angled or curved, such as for providing a region for a display or iconistic display or indicator or for providing a region for a user input, such as a touch feature or input or human machine interface (HMI) or proximity sensor or the like. For example, and such as shown in FIG. 5, the bottom region of the mirror reflective element may have an angled region, such as, for example, a 30 degree slope up, for a touch feature or proximity sensor feature at or along the bottom region of the mirror reflective element (such as for controlling a video display screen disposed behind the mirror reflective element, such as for actuating and deactuating the video display screen, controlling intensity of displayed images, panning, zooming, etc. of the displayed images, and/or the like). The mirror thus may have a folded region or portion along the bottom for other display features such as icons or touch and illumination. This folded feature could optionally be along the sides or top of the reflective element. The side regions of the mirror may also or otherwise have a curved edge away from the driver for various displays, lights, icons or warning lights. If the mirror reflective element has a touch feature, the touch feature could extend into the curved edge.

For a full video mirror, the curved edge feature could be reserved for alarms/warning/etc., while the main display is reserved for the field of view.

To increase the functionality of the full video interior mirror, the display may be unfolded like a book to provide additional features/information/display such as additional images from other cameras or sources. The mirror may be hinged such that the rear display would rotate down on demand.

The above may also be achieved by having a two-sided display where the front display may be smaller and the rear display may be on the back and folded up. In normal driving, only the front display is used for field of view. The rear display is then unfolded and turned around for additional features. Similarly, the display element may fold at a top or either side edge of the mirror assembly. Thus, the reflective element may be foldable between a folded or stowed state, where the foldable display element is disposed behind the flexible glass substrate, and a display state, where the foldable display element is unfolded to display information below or at a side of the flexible glass substrate.

For applications at exterior rearview mirror assemblies, the exterior mirror reflective element may be foldable such that the glass itself folds and opens. Thus, the mirror and reflective element may be smaller (e.g. for everyday driving) and may open to extend the field of view (e.g. for towing). The mirror and reflective element may also collapse further (e.g. for parking), while being adjustable to provide a desired rearward or downward or sideward view to the driver of the vehicle.

The substrate may comprise flexible plastic for various applications but may comprise one or more thin/flexible/conformable glass substrates. There are glass substrates that can be formed into complex shapes but not for repeatable cycles and a truly bendable glass substrate may cycle from flat to bent. Both approaches can provide new form/function for the EC and non EC devices.

With the move away from bulky plastic housing and bezels and with the addition of touch sensing technology, automotive mirrors have very little to no protection from mechanical damage. Thus, there is an increased need to improve the overall mechanical strength and durability of mirror assemblies such as to make the glass less prone to scratches, edge chips and breakage. Glass may be strengthened such as via, for example, thermal tempering or chemical means or the like.

Chemically strengthened glass has improved scratch resistance, head impact resistance, and improved yield due to reduced scratches and breakage during the mirror manufacturing process. An example of chemically strengthened glass is GORILLA® glass from Corning. This glass is commercially available with a 0.5 mm thickness to a 2.1 mm thickness.

For an electrochromic device, either one or both glass substrates may be chemically strengthened. The laminate structure of an EC mirror assembly with even just one chemically strengthened glass substrate would show improvements in impact tests compared to a structure with two standard annealed glass substrates.

The chemically strengthened glass allows for thinner glass substrates, thereby reducing the weight added to a mirror assembly compared to traditional glass applications. Reducing weight is a consideration for reducing the vibration of both interior and exterior mirrors. For exterior mirrors, the size of an actuator can be reduced for use with a lighter mirror assembly because the actuator may require relatively less force to bend, curve and/or hold a shape in a mirror reflective element.

Exterior rearview mirror assemblies may be equipped with electric heater pads for providing a deicing or defogging function. Chemically strengthened, thinner glass is stronger and also transfers heat faster (relative to standard glass substrates), which allows for compatibility with both lower wattage heater pads (to achieve similar deicing capabilities relative to mirror assemblies using standard glass substrates and higher wattage heater pads) and higher wattage heater pads (for significantly faster deicing relative to mirror assemblies using standard glass substrates that may not be able to withstand stresses caused by a higher wattage heater pad).

Heat tempered glass is typically applied to thicker glass substrates (thicker than 3 mm). Chemical strengthening can be applied to very thin glass less than 1 mm thick or less than 0.5 mm thick down to 0.1 mm thick or even thinner. Heat tempered glass cannot be cut after tempering but chemically strengthened glass sheets can be cut to the desired shapes.

In the chemical strengthening process, glass is submerged into a chemical bath comprised primarily of molten potassium salt. Over time, the bath draws out sodium ions naturally found in the glass and replaces them with the potassium ions found in the bath. Potassium ions, an alkali metal, are larger than sodium ions, so their presence in the surface of the glass creates a state of compression, while the core of the glass is left in a state of compensating tension.

The high-performance glass generated by the chemical strengthening process is very strong and, when performed properly, leaves no discernable surface distortion thanks to the very shallow layer of alkali-enriched material. Other benefits offered by chemical strengthening include a large range of precise properties to suit virtually any application, achievable by altering the chemical bath's composition, and the ability to treat glass that is considerably thinner than glass that can be thermally tempered.

Chemically strengthened glass can be utilized in harsh and challenging environments, such as automotive interior and exterior mirrors.

Thermal tempering performs the same basic function as chemical strengthening—altering tension levels of different layers of glass—but does so physically as opposed to chemically. In the tempering process, glass is superheated and then immediately rapidly cooled. When heated, the glass expands, and when cooled quickly, the exterior of the glass contracts, particularly around the edges and on the surfaces. Because the core of the glass retains heat for a longer period of time, it does not contract as much as the surface; this leads to a compressed surface and a core exerting compensating tension.

Tempered glass is commonly used in high pressure, high temperature, and extreme temperature fluctuation applications, including a wide array of industrial environments. Because of how it breaks—into small, generally circular pieces, as opposed to long, sharp shards—tempered glass is used in many safety glass applications.

The mirror reflective element 14 may comprise a single thin flexible glass substrate having a mirror reflector coated at a surface thereof (such as for an interior prismatic mirror assembly or exterior non-electrochromic mirror assembly) or may comprise a laminate construction variable reflectance electro-optic (such as electrochromic) reflective element assembly having a thin flexible front glass substrate and a thin flexible rear glass substrate with an electro-optic medium (such as electrochromic medium) sandwiched therebetween and bounded by a perimeter seal, or may comprise a laminate construction where one or more thin flexible glass substrates have a front glass or plastic substrate with a rounded perimeter edge region attached at a front surface of the mirror reflective element (such as by utilizing aspects of the mirror assemblies described in U.S. Pat. No. 10,543,785, which is hereby incorporated herein by reference in its entirety).

In such laminate electro-optic or electrochromic constructions, the front glass substrate has a front or first surface (the surface that generally faces the driver of a vehicle when the mirror assembly is normally mounted at the vehicle) and a rear or second surface opposite the front surface, and the rear glass substrate has a front or third surface and a rear or fourth surface opposite the third surface, with the electro-optic medium disposed between the second surface and the third surface and bounded by the perimeter seal of the reflective element (such as is known in the electrochromic mirror art). The second surface of front glass substrate has a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface has a metallic reflector coating (or multiple layers or coatings) established thereat. The third surface of rear glass substrate may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The third surface defines the active EC area or surface of the rear substrate within the perimeter seal. The coated third surface may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

Optionally, a hiding layer or perimeter band may be reflective or not reflective and may utilize aspects of the perimeter bands and mirror assemblies described in U.S. Pat. Nos. 5,066,112; 7,626,749; 7,274,501; 7,184,190; 7,255,451; 8,508,831 and/or 8,730,553, which are all hereby incorporated herein by reference in their entireties.

The reflective element and mirror casing are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like, while remaining within the spirit and scope of the present invention. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831 and/or 8,730,553, and/or U.S. Publication Nos. US-2014-0022390; US-2014-0293169 and/or US-2015-0097955, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

The back plate may comprise any suitable construction. Optionally, for example, a common or universal back plate, whereby the appropriate or selected socket element or pivot element (such as a socket element or such as a ball element or the like) is attached to the back plate to provide the desired pivot joint for the particular mirror head in which the back plate is incorporated. Optionally, when molding the back plate, a different insert may be provided to integrally mold a portion of or all of a ball member or the like (such as a portion of a base of a ball member, whereby the ball member may comprise a metallic ball member that is insert molded at the base and at the rear of the back plate during the injection molding process that forms the back plate, such as by utilizing aspects of the mirror assemblies described in U.S. Pat. Nos. 7,855,755; 7,249,860 and 6,329,925 and/or U.S. Pat. Pub. No. US-2006-0061008, which are hereby incorporated herein by reference in their entireties).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Although shown as an electrochromic mirror application, it is envisioned that the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855; 755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

Optionally, the mirror assembly may comprise a dual-mode mirror assembly or full mirror display assembly, whereby the mirror assembly functions as an interior rearview mirror assembly to provide a reflected rearward view to the driver, and also selectively functions as a video display that displays video images captured by a rearward viewing camera of the vehicle. The interior mirror assembly thus can switch from a traditional reflection mode to a live-video display mode, such as is by utilizing aspects of the mirror assemblies and systems described in U.S. Pat. Nos. 10,442,360; 10,421,404; 10,166,924 and/or 10,046,706, and/or U.S. Publication Nos. US-2020-0377022; US-2019-0258131; US-2019-0146297; US-2019-0118717 and/or US-2017-0355312, and/or U.S. patent application Ser. No. 16/949,976, filed Nov. 23, 2020, now U.S. Pat. No. 11,498,494, and/or Ser. No. 17/247,127, filed Dec. 1, 2020, now U.S. Pat. No. 11,505,123, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular rearview mirror assembly, the vehicular rearview mirror assembly comprising:
   a mirror reflective element comprising a flexible glass substrate having a mirror reflector coating disposed at a surface of the flexible glass substrate;
   a flexible display element disposed at a rear surface of the flexible glass substrate, wherein, when the flexible display element is operated, information displayed by the flexible display element is viewable through the flexible glass substrate;

an electrically-operated actuator operable to cause flexing of the flexible glass substrate and the flexible display element;

wherein, with the vehicular rearview mirror disposed at a vehicle, and responsive to actuation of a user actuatable input by a driver of the vehicle, the electrically-operated actuator operates to adjust a curvature of the flexible glass substrate and the flexible display element; and wherein, at least when the flexible display element is not operated, adjustment of the curvature of the flexible glass substrate and the flexible display element adjusts at least a portion of a rearward view of the driver of the vehicle when viewing the mirror reflective element.

2. The vehicular rearview mirror assembly of claim 1, wherein the vehicular rearview mirror assembly comprises an interior vehicular rearview mirror assembly configured to mount at an interior portion of the vehicle.

3. The vehicular rearview mirror assembly of claim 1, wherein the vehicular rearview mirror assembly comprises an exterior vehicular rearview mirror assembly configured to mount at an exterior portion of the vehicle.

4. The vehicular rearview mirror assembly of claim 3, wherein, with the flexible glass substrate at a first curvature, the driver of the vehicle has a view rearward of the vehicle when viewing the mirror reflective element, and wherein, with the flexible glass substrate flexed to a second curvature, the driver of the vehicle has a wide angle view sideward of the vehicle.

5. The vehicular rearview mirror assembly of claim 4, wherein the first curvature has a first radius of curvature greater than 3,000 mm, and wherein the second curvature has a second radius of curvature less than 2,000 mm.

6. The vehicular rearview mirror assembly of claim 3, wherein the electrically-operated actuator automatically adjusts the curvature of the flexible glass substrate to provide a downward view to the driver responsive to shifting of the vehicle into a reverse gear.

7. The vehicular rearview mirror assembly of claim 3, wherein the electrically-operated actuator automatically adjusts the curvature of the flexible glass substrate to provide a blind spot view to the driver responsive to detection of another vehicle in a side lane adjacent to a traffic lane along which the vehicle is traveling.

8. The vehicular rearview mirror assembly of claim 1, wherein the flexible glass substrate is mounted at an adjustable attachment plate, and wherein the electrically-operated actuator, when operated, operates to adjust one or more portions of the adjustable attachment plate relative to the other portions of the adjustable attachment plate to adjust the curvature of the flexible glass substrate.

9. The vehicular rearview mirror assembly of claim 1, wherein the flexible glass substrate is mounted at a flexible attachment plate, and wherein the electrically-operated actuator, when operated, operates to flex one or more portions of the flexible attachment plate relative to the other portions of the flexible attachment plate to adjust the curvature of the flexible glass substrate.

10. The vehicular rearview mirror assembly of claim 1, wherein the flexible glass substrate is mounted at a segmented attachment plate, and wherein the electrically-operated actuator, when operated, operates to adjust one or more segments of the segmented attachment plate relative to the other segments of the segmented attachment plate to adjust the curvature of the flexible glass substrate.

11. The vehicular rearview mirror assembly of claim 1, wherein the mirror reflector coating comprises a transflective mirror reflector coating, and wherein, when the flexible display element is operated, information displayed by the flexible display element is viewable through the transflective mirror reflector coating.

12. The vehicular rearview mirror assembly of claim 1, wherein the flexible glass substrate comprises chemically strengthened glass having a thickness of less than 1 mm.

13. An exterior vehicular rearview mirror assembly, the exterior vehicular rearview mirror assembly comprising:

a mirror reflective element comprising a flexible glass substrate having a mirror reflector coating disposed at a surface of the flexible glass substrate;

a flexible display element disposed at a rear surface of the flexible glass substrate, wherein, when the flexible display element is operated, information displayed by the flexible display element is viewable through the flexible glass substrate;

an electrically-operated actuator operable to cause flexing of the flexible glass substrate and the flexible display element;

wherein the flexible glass substrate is mounted at an adjustable attachment plate;

wherein the exterior vehicular rearview mirror assembly is configured to mount at an exterior portion of a vehicle; and wherein, with the exterior vehicular rearview mirror mounted at the exterior portion of the vehicle, and responsive to actuation of a user actuatable input by a driver of the vehicle, the electrically-operated actuator operates to adjust one or more portions of the adjustable attachment plate relative to the other portions of the adjustable attachment plate to adjust a curvature of the flexible glass substrate and the flexible display element; and wherein, at least when the flexible display element is not operated, adjustment of the curvature of the flexible glass substrate and the flexible display element adjusts at least a portion of a rearward view of the driver of the vehicle when viewing the mirror reflective element.

14. The exterior vehicular rearview mirror assembly of claim 13, wherein, with the flexible glass substrate at a first curvature, the driver of the vehicle has a view rearward of the vehicle when viewing the mirror reflective element, and wherein, with the flexible glass substrate flexed to a second curvature, the driver of the vehicle has a wide angle view sideward of the vehicle.

15. The exterior vehicular rearview mirror assembly of claim 14, wherein the first curvature has a first radius of curvature greater than 3,000 mm, and wherein the second curvature has a second radius of curvature less than 2,000 mm.

16. The exterior vehicular rearview mirror assembly of claim 13, wherein the electrically-operated actuator automatically adjusts the curvature of the flexible glass substrate to provide a downward view to the driver responsive to shifting of the vehicle into a reverse gear.

17. The exterior vehicular rearview mirror assembly of claim 13, wherein the electrically-operated actuator automatically adjusts the curvature of the flexible glass substrate to provide a blind spot view to the driver responsive to detection of another vehicle in a side lane adjacent to a traffic lane along which the vehicle is traveling.

18. The exterior vehicular rearview mirror assembly of claim 13, wherein the adjustable attachment plate comprises a flexible attachment plate, and wherein the electrically-operated actuator, when operated, operates to flex one or more portions of the flexible attachment plate relative to the other portions of the flexible attachment plate to adjust the curvature of the flexible glass substrate.

19. The exterior vehicular rearview mirror assembly of claim 13, wherein the adjustable attachment plate comprises a segmented attachment plate, and wherein the electrically-operated actuator, when operated, operates to adjust one or more segments of the segmented attachment plate relative to the other segments of the segmented attachment plate to adjust the curvature of the flexible glass substrate.

20. The exterior vehicular rearview mirror assembly of claim 13, wherein the mirror reflector coating comprises a transflective mirror reflector coating, and wherein, when the flexible display element is operated, information displayed by the flexible display element is viewable through the transflective mirror reflector coating.

21. The exterior vehicular rearview mirror assembly of claim 13, wherein the flexible display element displays a demarcation at a transition between regions of the flexible glass substrate that are adjusted to have different curvatures.

22. The exterior vehicular rearview mirror assembly of claim 13, wherein the flexible glass substrate comprises chemically strengthened glass having a thickness of less than 1 mm.

23. A vehicular rearview mirror assembly, the vehicular rearview mirror assembly comprising:
  a mirror reflective element comprising a flexible glass substrate having a transflective mirror reflector coating disposed at a surface of the flexible glass substrate;
  wherein the flexible glass substrate is mounted at an adjustable attachment plate;
  a flexible display element disposed between the adjustable attachment plate and the flexible glass substrate;
  an electrically-operated actuator operable to adjust a curvature of the adjustable attachment plate to cause flexing of the flexible display element and the flexible glass substrate;
  wherein, when the flexible display element is operated, information displayed by the flexible display element is viewable through the flexible glass substrate and through the transflective mirror reflector coating;
  wherein, with the vehicular rearview mirror disposed at a vehicle, and responsive to actuation of a user actuatable input by a driver of the vehicle, the electrically-operated actuator operates to adjust one or more portions of the adjustable attachment plate relative to the other portions of the adjustable attachment plate to adjust a curvature of the adjustable attachment plate, the flexible display element and the flexible glass substrate; and
  wherein, at least when the flexible display element is not operated, adjustment of the curvature of the adjustable attachment plate, the flexible display element and the flexible glass substrate adjusts at least a portion of a rearward view of the driver of the vehicle when viewing the mirror reflective element.

24. The vehicular rearview mirror assembly of claim 23, wherein the vehicular rearview mirror assembly comprises an interior vehicular rearview mirror assembly configured to mount at an interior portion of the vehicle.

25. The vehicular rearview mirror assembly of claim 23, wherein the adjustable attachment plate comprises a flexible attachment plate, and wherein the electrically-operated actuator, when operated, operates to flex one or more portions of the flexible attachment plate relative to the other portions of the flexible attachment plate to adjust the curvature of the flexible glass substrate.

26. The vehicular rearview mirror assembly of claim 23, wherein the adjustable attachment plate comprises a segmented attachment plate, and wherein the electrically-operated actuator, when operated, operates to adjust one or more segments of the segmented attachment plate relative to the other segments of the segmented attachment plate to adjust the curvature of the flexible glass substrate.

27. The vehicular rearview mirror assembly of claim 23, wherein a plurality of touch or proximity sensors is disposed along a perimeter region of the flexible glass substrate, and wherein the touch or proximity sensors are actuatable by the driver to control operation of the flexible display element.

28. The vehicular rearview mirror assembly of claim 23, wherein the flexible glass substrate comprises chemically strengthened glass having a thickness of less than 1 mm.

* * * * *

UNITED STATES PATENT AND TRADEMARK OFFICE
CERTIFICATE OF CORRECTION

Page 1 of 1

PATENT NO. : 12,049,168 B2
APPLICATION NO. : 17/248317
DATED : July 30, 2024
INVENTOR(S) : Hamid Habibi It is certified that error appears in the above-identified patent and that said Letters Patent is hereby corrected as shown below:

In the Specification

Column 7
Line 59, "indium oxide (10) layers" should be --indium oxide (IO) layers--

Signed and Sealed this
Twenty-seventh Day of August, 2024

Katherine Kelly Vidal
*Director of the United States Patent and Trademark Office*